(12) United States Patent
Stenzel (10) Patent No.: US 8,995,221 B2
(45) Date of Patent: Mar. 31, 2015

(54) TOWED MARINE SENSOR STREAMER HAVING CONCENTRIC STRESS MEMBER

(75) Inventor: Andre Stenzel, Sugar Land, TX (US)

(73) Assignee: PGS Geophysical AS, Oslo (NO)

( * ) Notice: Subject to any disclaimer, the term of this patent is extended or adjusted under 35 U.S.C. 154(b) by 1322 days.

(21) Appl. No.: 12/584,511

(22) Filed: Sep. 8, 2009

(65) Prior Publication Data

US 2011/0058449 A1    Mar. 10, 2011

(51) Int. Cl.
   *G01V 1/38*    (2006.01)
   *G01V 1/20*    (2006.01)

(52) U.S. Cl.
   CPC .................................... *G01V 1/201* (2013.01)
   USPC ......................................................... 367/20

(58) Field of Classification Search
   CPC ...................................................... G01V 1/201
   USPC .................................. 367/15–20; 174/101.5
   See application file for complete search history.

(56) References Cited

U.S. PATENT DOCUMENTS

| | | | |
|---|---|---|---|
| 4,481,611 A | | 11/1984 | Burrage |
| 4,641,288 A | * | 2/1987 | McGowan et al. ............. 367/20 |
| 6,091,670 A | | 7/2000 | Oliver et al. |
| 6,128,251 A | * | 10/2000 | Erath et al. ..................... 367/154 |
| 6,559,383 B1 | * | 5/2003 | Martin ........................ 174/84 R |
| 2005/0146984 A1 | | 7/2005 | Lee et al. |
| 2008/0074946 A1 | * | 3/2008 | Hillesund et al. ............... 367/15 |
| 2008/0144434 A1 | | 6/2008 | Hegna et al. |
| 2008/0312878 A1 | * | 12/2008 | Robertsson et al. .......... 702/189 |
| 2009/0010101 A1 | | 1/2009 | Lunde et al. |

FOREIGN PATENT DOCUMENTS

GB    2 329 369    3/1999

OTHER PUBLICATIONS

Frank de Jong, European Search Report, Mailing Date: Mar. 22, 2012.
Frank de Jong, European Search Report, Mailing Date: Jul. 12, 2012.

* cited by examiner

*Primary Examiner* — Krystine Breier (57) ABSTRACT

A seismic streamer includes a jacket covering an exterior of the streamer. At least one strength member extends the length of the jacket. The strength member is formed as a substantially flat belt having a width to thickness ratio of at least 10. At least one sensor holder is coupled to the at least one strength member. The at least one sensor holder includes at least one arcuate opening for receiving the at least one strength member. The at least one arcuate opening is laterally displaced from a center of the at least one sensor holder such that when the at least one strength member is disposed therein the at least one strength member is substantially tube shaped and substantially coaxial with the jacket.

62 Claims, 6 Drawing Sheets

TOWED MARINE SENSOR STREAMER HAVING CONCENTRIC STRESS MEMBER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic survey apparatus and methods. More specifically, the invention relates to structures for marine seismic streamers that have reduced noise induced by effects of towing such streamers in the water.

2. Background Art

In a marine seismic survey, a seismic vessel travels on the surface of a body of water such as a lake or the ocean. The seismic vessel typically contains seismic acquisition control equipment, which includes devices such as navigation control, seismic source control, seismic sensor control, and signal recording devices. The seismic acquisition control equipment causes a seismic source towed in the body of water, by the seismic vessel or another vessel, to actuate at selected times. The seismic source may be any type well known in the art of seismic acquisition, including air guns or water guns, or most commonly, arrays of air guns. Seismic streamers, also called seismic cables, are elongate cable-like structures that are towed in the body of water by the seismic survey vessel or by another vessel. Typically, a plurality of seismic streamers is towed behind the seismic vessel laterally spaced apart from each other. The seismic streamers contain sensors to detect the seismic wavefields initiated by the seismic source and reflected from acoustic impedance boundaries in the subsurface Earth formations below the water bottom.

Conventionally, seismic streamers contain pressure-responsive sensors such as hydrophones, but seismic streamers have also been proposed that contain particle motion sensors, such as geophones, in addition to hydrophones. The sensors are typically located at regular intervals along the length of seismic streamers.

Seismic streamers also include electronic components, electrical wiring and may include other types of sensors. Seismic streamers are typically assembled from sections, each section being approximately 75 meters in length. A number of such sections are joined end to end, and can extend the assembled streamer to a total length of many thousands of meters. Position control devices, such as depth controllers, paravanes, and tail buoys are affixed to the streamer at selected positions and are used to regulate and monitor the movement of the streamer in the water. During operation, the seismic sources and streamers are typically submerged at a selected depth in the water. The seismic sources are typically operated at a depth of 5-15 meters below the water surface and the seismic streamers are typically operated at a depth of 5-40 meters.

A typical streamer section consists of an external jacket, connectors, spacers, and strength members. The external jacket is formed from a flexible, acoustically transparent material such as polyurethane and protects the interior of the streamer section from water intrusion. The connectors are disposed at the ends of each streamer section and link the section mechanically, electrically and/or optically to adjacent streamer sections and, therefore, ultimately link it to the seismic towing vessel. There is at least one, and are usually two or more such strength members in each streamer section that extend the length of each streamer section from one end connector to the other. The strength members provide the streamer section with the capability to carry axial mechanical load. Generally, the strength members are in the shape of ropes. Typically, the strength members will be displaced from the center of the streamer to enable locating seismic sensors in the center of the streamer. Such placement of strength members has the effect of making strain distribution radially asymmetric.

There continues to be a need for structures for marine sensor streamers that provide improved strain distribution within the cross sections thereof.

SUMMARY OF THE INVENTION

One aspect of the invention is a seismic streamer. A seismic streamer according to this aspect of the invention includes a jacket covering an exterior of the streamer. At least one strength member extends the length of the jacket. The strength member is formed as a substantially flat belt having a width to thickness ratio of at least 10. At least one sensor holder is coupled to the at least one strength member. The at least one sensor holder includes at least one arcuate opening for receiving the at least one strength member. The at least one arcuate opening is laterally displaced from a center of the at least one sensor holder such that when the at least one strength member is disposed therein the at least one strength member is substantially tube shaped and substantially coaxial with the jacket.

Other aspects and advantages of the invention will be apparent from the following description and the appended claims.

DETAILED DESCRIPTION

Figure 1:
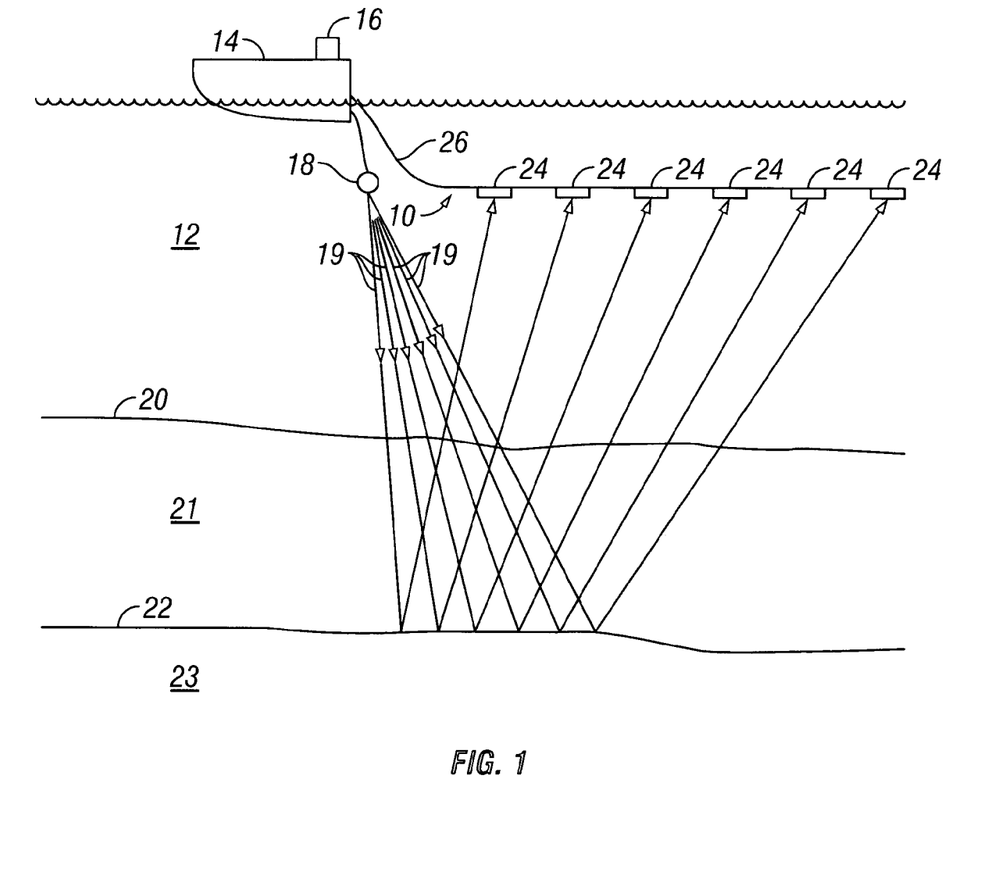
FIG. 1 shows typical marine seismic data acquisition using a streamer according to one embodiment of the invention.
Figure 4:
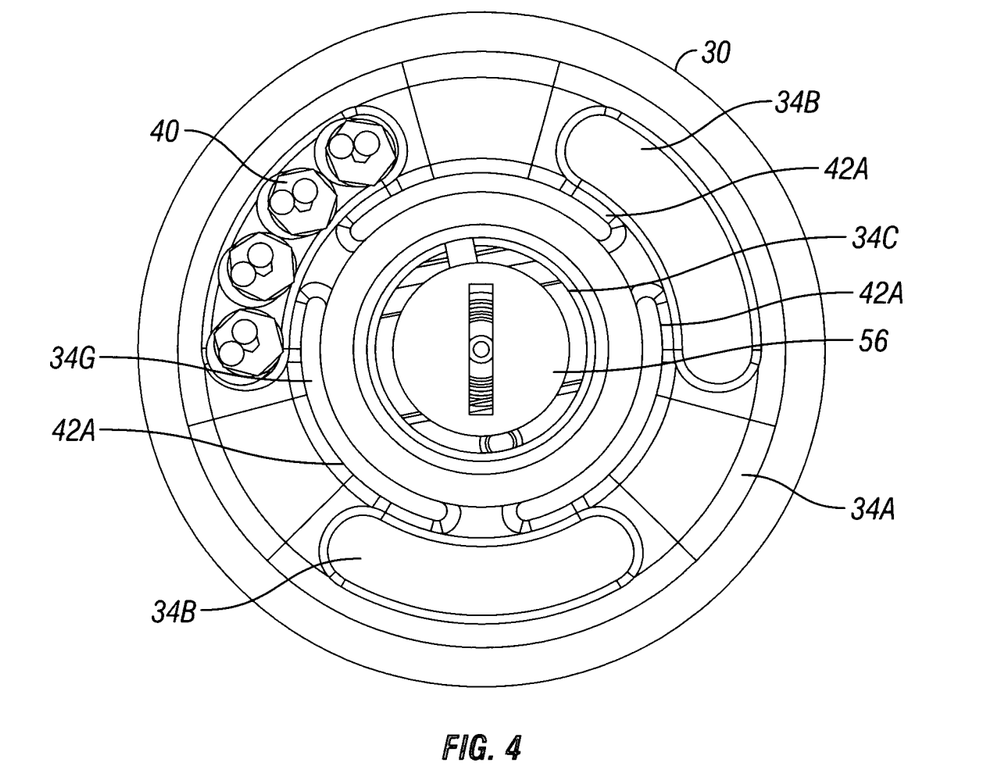
FIG. 4 shows a cross section of a sensor holder, sensor, and strength member according to the invention.

FIG. 1 shows an example marine seismic data acquisition system as it is typically used on acquiring seismic data. A seismic vessel 14 moves along the surface of a body of water 12 such as a lake or the ocean. The marine seismic survey is intended to detect and record seismic signals related to structure and composition of various subsurface Earth formations 21, 23 below the water bottom 20. The seismic vessel 14 includes source actuation, data recording and navigation equipment, shown generally at 16, referred to for convenience as a "recording system." The seismic vessel 14, or a different vessel (not shown), can tow one or more seismic energy sources 18, or arrays of such sources in the water 12. The seismic vessel 14 or a different vessel tows at least one seismic streamer 10 near the surface of the water 12. The streamer 10 is coupled to the vessel 14 by a lead in cable 26. A plurality of sensor elements 24, or arrays of such sensor elements, are disposed at spaced apart locations along the streamer 10. The sensor elements 24, as will be explained in more detail below with reference to FIG. 4, are formed by mounting a seismic sensor inside a sensor holder. The structure of the streamer will be more fully explained with reference to FIGS. 4 through 6.

During operation, certain equipment (not shown separately) in the recording system 16 causes the source 18 to actuate at selected times. When actuated, the source 18 produces seismic energy 19 that emanates generally outwardly from the source 18. The energy 19 travels downwardly, through the water 12, and passes, at least in part, through the water bottom 20 into the formations 21, 23 below. Seismic energy 19 is at least partially reflected from one or more acoustic impedance boundaries 22 below the water bottom 20, and travels upwardly whereupon it may be detected by the sensors in each sensor element 24. Structure of the formations 21, 23, among other properties of the Earth's subsurface, can be inferred by travel time of the energy 19 and by characteristics of the detected energy such as its amplitude and phase.

Figure 2:
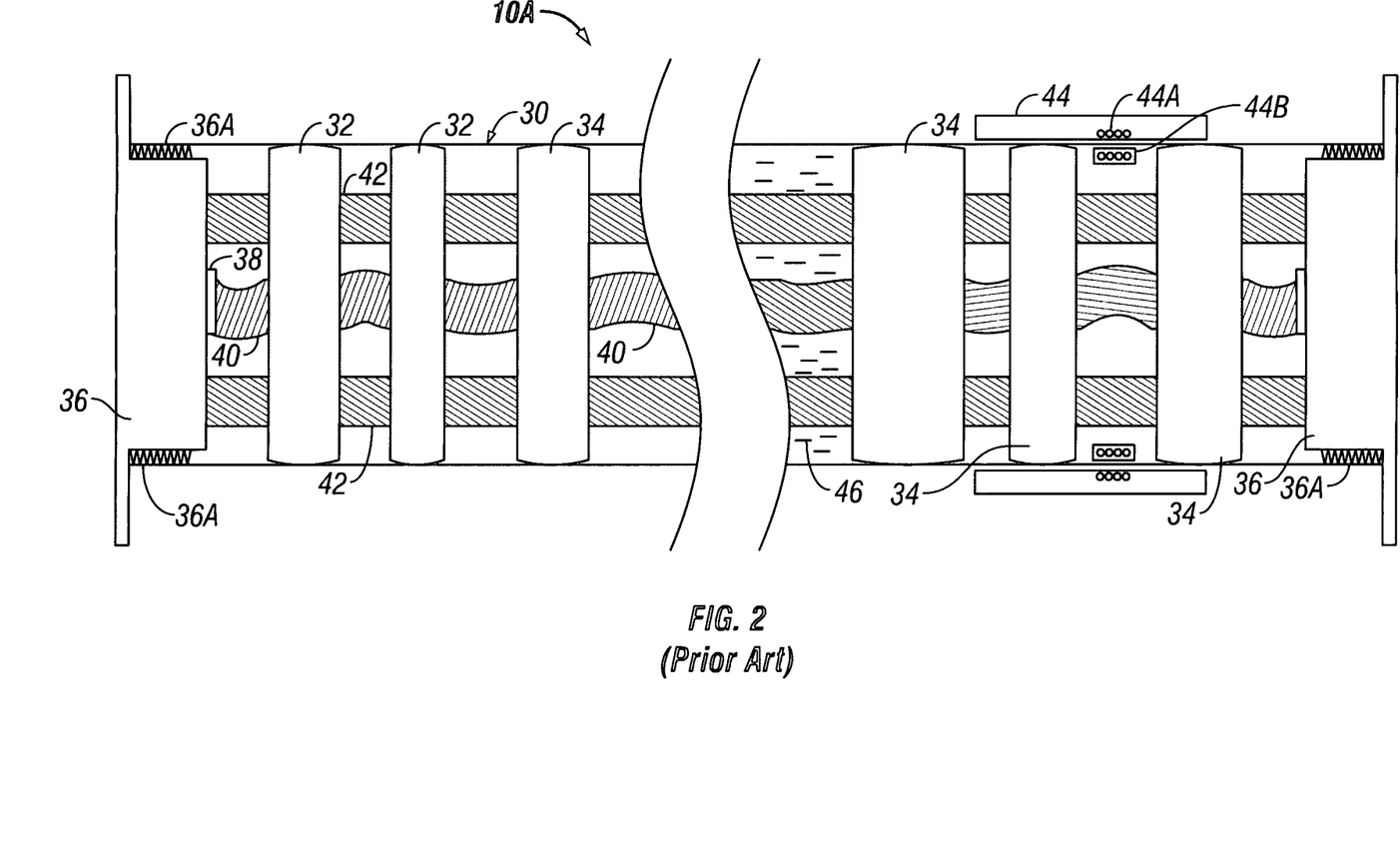
FIG. 2 shows a cut away view of one embodiment of a prior art streamer segment.

Having explained the general method of operation of a marine seismic streamer, an example embodiment of a prior art streamer according to the will be explained with reference to FIG. 2. The purpose for explaining the prior art streamer structure in FIG. 2 is to more clearly show the differences between prior art streamer construction and examples of a streamer according to the invention. FIG. 2 is a cut away view of a portion (segment) 10A of a typical marine seismic streamer (10 in FIG. 1). A streamer as shown in FIG. 1 may extend behind the seismic vessel (14 in FIG. 1) for several kilometers, and is typically made from a plurality of streamer segments 10A as shown in FIG. 2 connected end to end behind the vessel (14 in FIG. 1).

The streamer segment 10A in the present embodiment may be about 75 meters overall length. A streamer such as shown at 10 in FIG. 1 thus may be formed by connecting a selected number of such segments 10A end to end. The segment 10A includes a jacket 30, which in the present embodiment can be made from 3.5 mm thick transparent polyurethane and has a nominal external diameter of about 62 millimeters. In each segment 10A, each axial end of the jacket 30 may be terminated by a coupling/termination plate 36. The coupling/termination block 36 may include rib elements 36A on an external surface of the coupling/termination block 36 that is inserted into the end of the jacket 30, so as to seal against the inner surface of the jacket 30 and to grip the coupling/termination block 36 to the jacket 30 when the jacket 30 is secured thereto by and external clamp (not shown). In the present embodiment, two strength members 42 are coupled to the interior of each coupling/termination block 36 and extend the length of the segment 10A. In a particular implementation of the invention, the strength members 42 may be made from a fiber rope made from a fiber sold under the trademark VECTRAN, which is a registered trademark of Hoechst Celanese Corp., New York, N.Y. The strength members 42 transmit axial load along the length of the segment 10A. When one segment 10A is coupled end to end to another such segment (not shown in FIG. 2), the mating coupling/termination blocks 36 are coupled together using any suitable connector, so that the axial force is transmitted through the coupling/termination blocks 36 from the strength members 42 in one segment 10A to the strength member in the adjoining segment.

In prior art streamers such as the one shown in FIG. 2, the strength members are generally circular in cross section and are attached to a number of buoyancy spacers 32 disposed in the jacket 30. The buoyancy spacers are coupled to the strength members 42 at spaced apart locations along their length and laterally displaced from the center thereof. The buoyancy spacers 32 may be made from foamed polyurethane or other suitable, selected density material. The buoyancy spacers 32 have a density selected to provide the segment 10A preferably with approximately the same overall density as the water (12 in FIG. 1), so that the streamer (10 in FIG. 1) will be substantially neutrally buoyant in the water (12 in FIG. 1). As a practical matter, the buoyancy spacers 32 provide the segment 10A with an overall density very slightly less than that of fresh water. Appropriate overall density may then be adjusted in actual use by adding selected buoyancy spacers 32 and fill media having suitable specific gravity.

The segment 10A includes a generally centrally located conductor cable 40 which can include a plurality of insulated electrical conductors (not shown separately), and may include one or more optical fibers (not shown). The cable 40 conducts electrical and/or optical signals from the seismic sensors (FIG. 3) to the recording system (16 in FIG. 1). The cable 40 may in some implementations also carry electrical power to various signal processing circuits (not shown separately) disposed in one or more segments 10A, or disposed elsewhere along the streamer (10 in FIG. 1). The length of the conductor cable 40 within a cable segment 10A is generally longer than the axial length of the segment 10A under the largest expected axial stress on the segment 10A, so that the electrical conductors and optical fibers in the cable 40 will not experience any substantial axial stress when the streamer 10 is towed through the water by a vessel. The conductors and optical fibers may be terminated in a connector 38 disposed in each coupling/termination block 36 so that when the segments 10A are connected end to end, corresponding electrical and/or optical connections may be made between the electrical conductors and optical fibers in the conductor cable 40 in adjoining segments 10A.

Sensors, which in the present embodiment may be hydrophones, can be disposed inside sensor holders, shown in FIG. 2 generally at 34. The hydrophones in the present embodiment can be of a type known to those of ordinary skill in the art, including but not limited to those sold under model number T-2BX by Teledyne Geophysical Instruments, Houston, Tex. In the present embodiment, each segment 10A may include 96 such hydrophones, disposed in arrays of sixteen individual hydrophones connected in electrical series. In a particular implementation of the invention, there are thus six such arrays, spaced apart from each other at about 12.5 meters. The spacing between individual hydrophones in each array should be selected so that the axial span of the array is at most equal to about one half the wavelength of the highest frequency seismic energy intended to be detected by the streamer (10 in FIG. 1).

At selected positions along the streamer a compass bird 44 may be affixed to the outer surface of the jacket 30. The compass bird 44 includes a directional sensor (not shown separately) for determining the geographic orientation of the segment 10A at the location of the compass bird 44. The compass bird 44 may include an electromagnetic signal transducer 44A for communicating signals to a corresponding transducer 44B inside the jacket 30 for communication along the conductor cable 40 to the recording system (16 in FIG. 1). Measurements of direction are used, as is known in the art, to infer the position of the various sensors in the segment 10A, and thus along the entire length of the streamer (10 in FIG. 1). Typically, a compass bird will be affixed to the streamer (10 in FIG. 1) about every 300 meters (every four segments 10A). One type of compass bird is described in U.S. Pat. No. 4,481, 611 issued to Burrage and incorporated herein by reference.

In the present embodiment, the interior space of the jacket 30 may be filled with a material 46 such as "BVF" (Buoyancy Void Filler), which may be a curable, synthetic urethane-based polymer. The BVF 46 serves to exclude fluid (water) from the interior of the jacket 30, to electrically insulate the various components inside the jacket 30, to add buoyancy to a streamer section and to transmit seismic energy freely through the jacket 30 to the sensors 34. The BVF 46 in its uncured state is essentially in liquid form. Upon cure, the BVF 46 no longer flows as a liquid, but instead becomes substantially solid. However, the BVF 46 upon cure retains some flexibility to bending stress, substantial elasticity, and freely transmits seismic energy to the sensors 24. It should be understood that the BVF used in the present embodiment only is one example of a gel-like substance that can be used to fill the interior of the streamer. Other materials could be also used. For example, heating a selected substance, such as a thermoplastic, above its melting point, and introducing the melted plastic into the interior of the jacket 30, and subsequent cooling, may also be used in a streamer according to the invention. Oil or similar material may also be used to fill the interior of the streamer.

The sensor holders 34, as explained in the Background section herein, are typically molded from a rigid, dense plastic to better protect the seismic sensors therein from damage during handling and use. The strength members 42 are typically tightly fit in, and adhesively bonded to through passages (52 in FIG. 3) in the sensor spacers 34.

Figure 3:
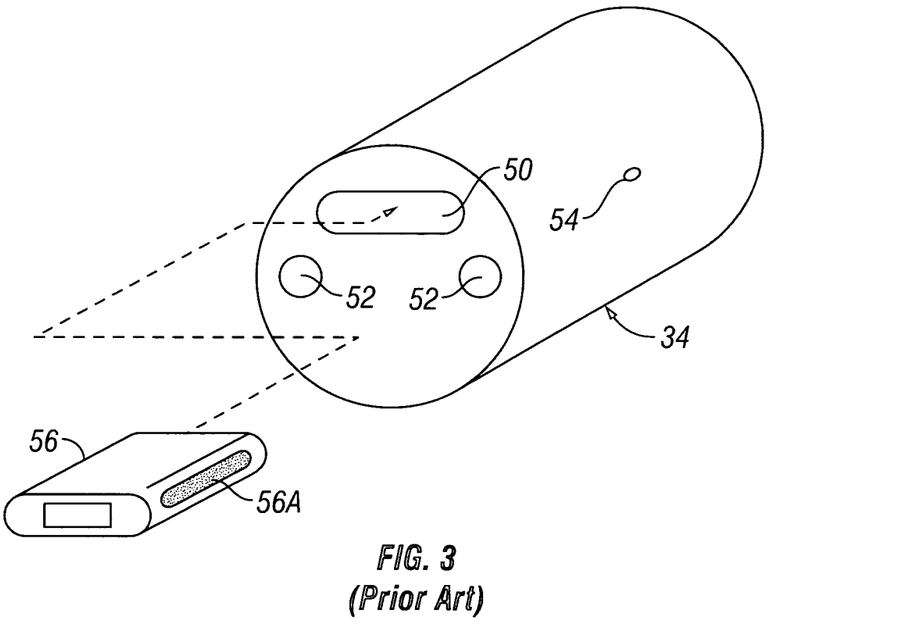
FIG. 3 shows a typical prior art assembly of a seismic sensor to a spacer.

FIG. 3 illustrates a manner known in the art in which seismic sensors are mounted in the sensor spacers. The space holder 34 includes an opening 50 shaped to accept a seismic sensor 56. The sensor 56 in this embodiment can be the model number T-2BX hydrophone made by Teledyne Geophysical Instruments, explained above with reference to FIG. 2. The housing of the sensor 56 includes ribs 56A on its lateral edges, such that when the sensor 56 is inserted into the opening 50, the sensor 56 is retained in the opening 50 by interference fit. The space holder 34 also includes through passages 52 through which the strength members (42 in FIG. 2) are inserted. An adhesive port 54 is provided on the space holder 34, and into which adhesive (not shown) is injected after the strength members (42 in FIG. 2) are inserted into the through passages 52.

Having explained typical prior art marine streamer structures, a marine sensor streamer according to the invention will now be explained with reference to FIGS. 4 through 6.

The principle for the present invention is to configure a strength member containing at least one strength member initially produced in the form of a substantially flat "belt", and physical characteristics that satisfy the axial load and elongation requirements for use in a towed streamer. The belt type strength member may be made from conventional materials and woven into its final form. The belt type strength member should have a width to thickness ratio of at least 10, and more preferably in a range of about 10 to 20. Such width to thickness ratio is expected to enable flexure transverse to the plane of the width of the strength member. Such flexure enables the strength member to be retained by chassis components, such as buoyancy and mounting spacers, so that the resulting configuration of the strength member is that of a substantially circular "tube."

FIG. 4 shows a cross section through one of the sensor holders 34A configured with strength members 42A as explained above. The sensor holder 34A may be made from materials as explained above and may have an outer diameter selected to fit snugly within the jacket 30. The sensor holder 34A may define an opening 34C generally concentric with the axis of the sensor holder 34A in which a sensor 56 may be mounted. The sensor 56 may be press fit in the opening 34C or may be retained in the opening by elastomer rings (not shown) or the like. The sensor holder defines one or more accurate openings 34B generally disposed near the outer edge of the sensor holder 34A that may be used for passage through the streamer of cables and other devices. The cable 40 explained with reference to FIG. 2 may be disposed in one of the arcuate openings 34B as shown in FIG. 2.

The strength members 42A may be made as explained above and preferably have the width to thickness ratio explained above. Such ratio enables the strength members 42A to be inserted into and made to conform to substantially arcuate openings 34G disposed in the interior of the sensor holder 34A. The present example shows three strength members 42A in each of three corresponding openings 34G. The number of strength members and corresponding number of openings is a matter of discretion for the designer of the streamers, however a possible benefit of making a streamer according to the invention, namely more radially distribution of tension in the streamer, may be more effectively realized if the strength members (in their respective arcuate openings) in combination traverse at least 75 percent of the possible circumference. It should also be noted that at irrespective of the total possible traversed circumference, at least some of the circumference traversed by the strength members should include gaps or spaces to admit substantially unobstructed pressure waves to the sensor.

Figure 5:
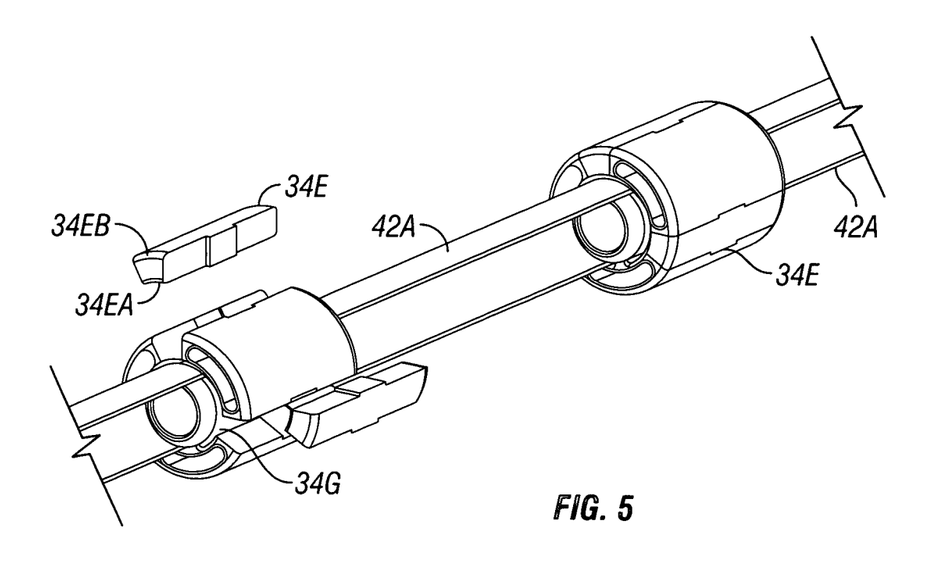
FIG. 5 shows an oblique view of the strength member assembled to sensor spacers or buoyancy spacers to illustrate one possible assembly method.

FIG. 5 shows an oblique view of the strength members 42A and sensor holders 34A, one of which is shown in exploded view, to illustrate one possible configuration for the sensor holder 34A to facilitate assembly of the streamer. It should be noted that similar configuration of that shown for the sensor holder 34A may be used for any or all of the buoyancy spacers (32 in FIG. 2). The arcuate openings 34G in an unassembled sensor holder 34A may be accessed by removal of a substantially wedge shaped plug 34E. The plug 34E is configured to be inserted into a portion of the opening 34G so that its innermost surface just comes into to contact with the surface of the strength member 42A when the strength member 42A is fully seated in the arcuate opening 34G. An outer surface 34EB of the plug 34E may conform to the outer surface of the sensor holder 34A when the plug 34E is assembled thereto. When the plugs 34E are assembled, as shown in the background sensor holder 34A in FIG. 5, the assembled sensor holder 34A will have a substantially smooth cylindrical surface for insertion into the jacket.

A marine sensor streamer made as explained herein may provide one or more of the following benefits. The streamer sensors may be coaxially located with the axis of the streamer. Such streamer may have better cross sectional symmetry in all directions resulting in lower sensor noise. Symmetrical distribution of load stresses and vibrations related to towing may result in lower towing noise. Placement of a wiring harness in the outer perimeter of the concentric stress member and using of spacers for its mechanical protection and slack distribution may better protect the harness and may make for more efficient assembly of the streamer.

Figure 6:
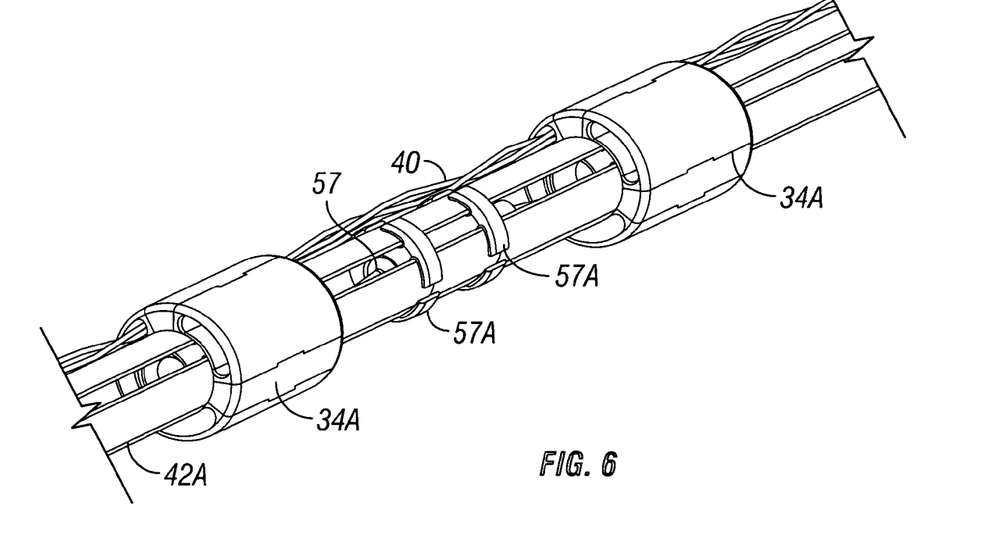
FIG. 6 shows an oblique view of an assembled "dual sensor" seismic streamer.

A portion of a fully assembled streamer harness is shown in FIG. 6, including two sensor holders 34A having sensors in the center thereof, for example a hydrophone. In the present example, particle motion sensors 57 may be mounted inside the strength members 42A and held in place, for example with band clamps 57A. Because of the arrangement of strength members in the present invention, such particle motion sensors may be substantially coaxial with the streamer. A non-liming example of a particle motion sensor is described in U.S. Pat. No. 7,239,577 issued to Tenghamn et al. and commonly owned with the present invention.

Figure 7:
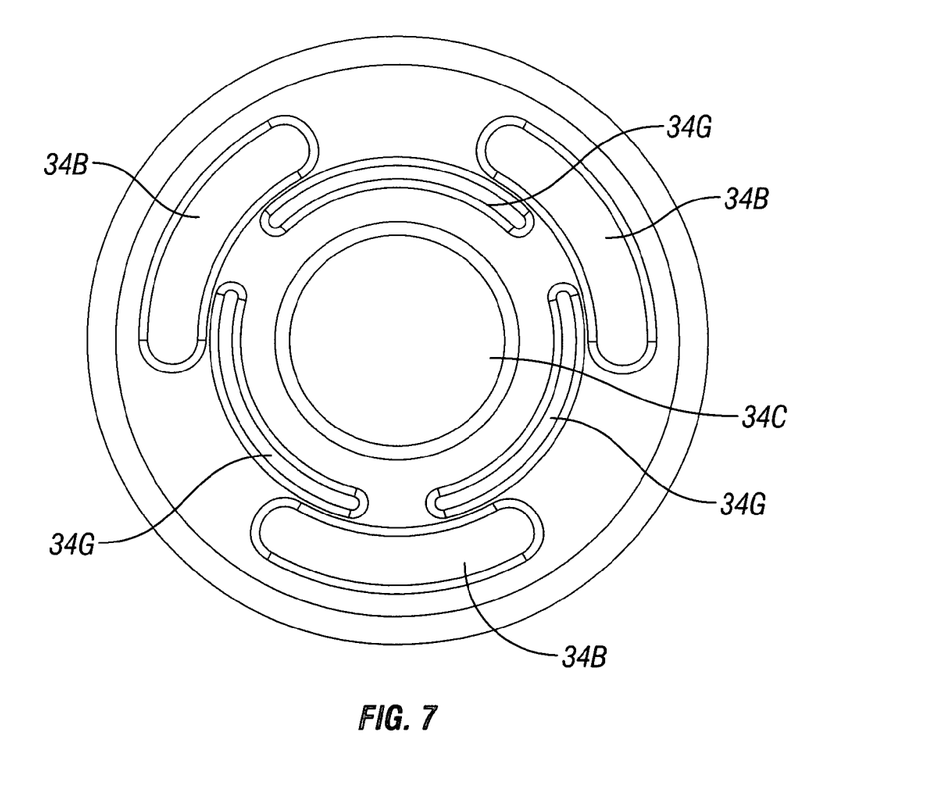
FIG. 7 shows an alternative sensor holder.

Another possible sensor holder is shown in end view in FIG. 7. The sensor holder in FIG. 7 may be made from a single molded piece of plastic and include openings as shown. The strength members may be threaded through the openings 34G.

Figure 8:
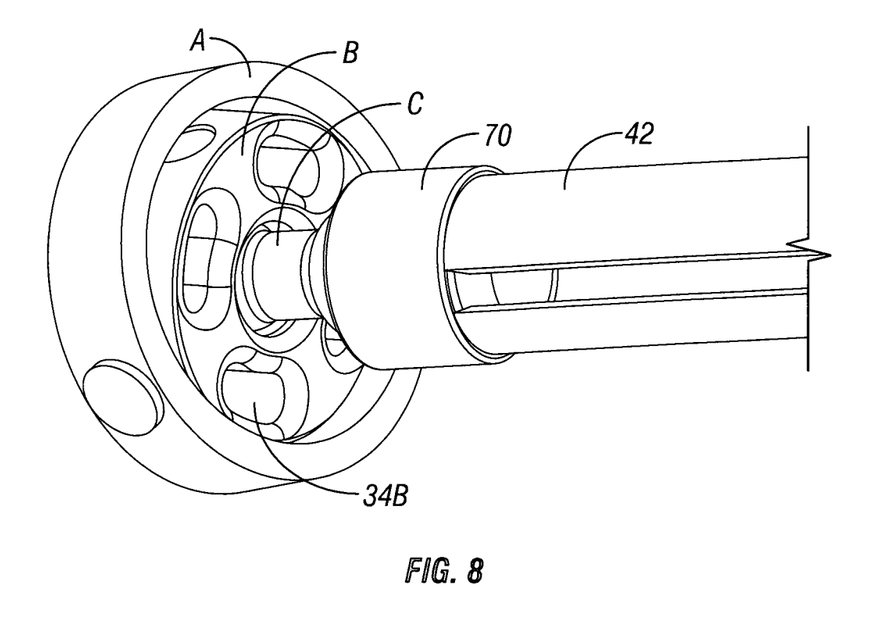
FIG. 8 shows an articulated termination for the strength members.
Figure 9:
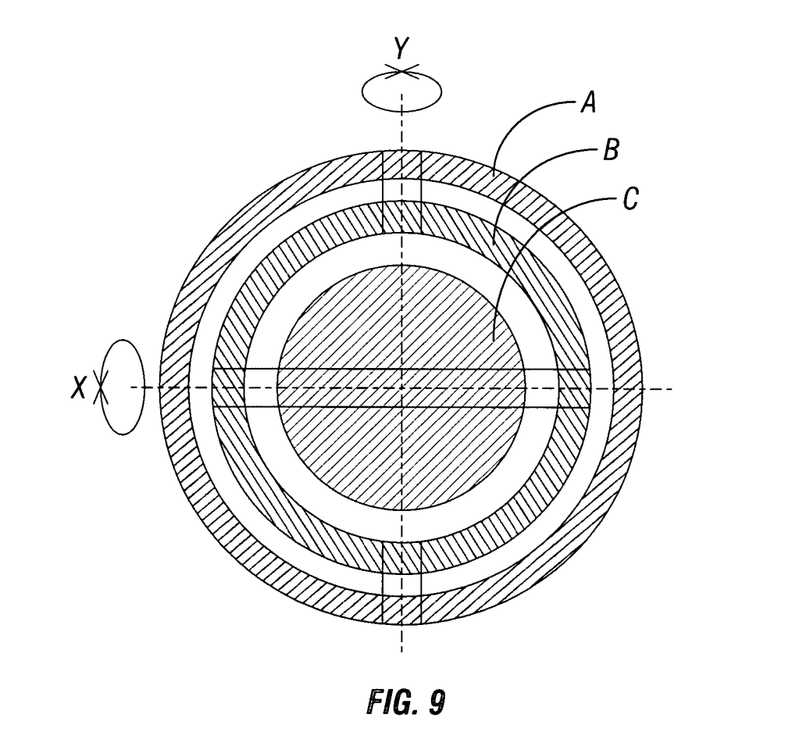
FIG. 9 shows the principle of operation of the articulated termination.

FIG. 8 shows a termination plate for the strength members 42, which includes a termination member 70 that can couple to a pivot C disposed in a frame B having openings 34B for the chassis. The frame B and pivot C may be enabled to pivot about orthogonal axes with respect to an outer termination housing A. The respective rotations are illustrated in FIG. 9.

A seismic streamer having strength members according to the various aspects of the invention may have better distribution of axial loading within the cross section of the streamer, thereby decreasing noise transmitted along the streamer.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic streamer, comprising:
   a jacket covering an exterior of the streamer;
   at least one strength member extending the length of the jacket, the strength member formed as a substantially flat belt having a width to thickness ratio of at least 10;
   at least one sensor holder coupled to the at least one strength member, the at least one sensor holder including at least one arcuate opening for receiving the at least one strength member, the at least one arcuate opening laterally displaced from a center of the at least one sensor holder such that when the at least one strength member is disposed therein the at least one strength member is substantially tube shaped and substantially coaxial with the jacket, wherein the at least one sensor holder comprises a plurality of circumferentially spaced apart arcuate openings each configured to receive a corresponding strength member, each corresponding strength member being formed as a substantially flat belt having a width to thickness ratio of at least 10, and wherein each such arcuate opening is closed between an exterior surface of the corresponding strength member and an exterior surface of the sensor holder by a wedge shaped plug.

2. The streamer of claim 1 wherein the jacket comprises polyurethane.

3. The streamer of claim 1 wherein the at least one strength member comprises woven fiber.

4. The streamer of claim 1 wherein the at least one sensor holder has an external diameter selected to substantially match an internal diameter of the jacket, the at least one sensor holder comprises an opening substantially coaxial with the jacket for retaining a sensor therein.

5. The streamer of claim 4 wherein the at least one sensor holder comprises an arcuate opening disposed between the strength member and an outer surface of the sensor holder to enable longitudinal passage of a cable therethrough.

6. The streamer of claim 1 further comprising buoyancy spacers disposed along the at least one strength member and inside the jacket at spaced apart locations, the spacers having a density selected to provide the streamer with a selected overall density.

7. The streamer of claim 6 wherein the buoyancy spacers comprise foamed polyurethane.

8. The streamer of claim 1 further comprising a cable disposed inside the jacket, the cable having at least one of electrical conductors and an optical fiber, the cable adapted to carry signals from at least one sensor disposed in the at least one sensor holder to a recording system.

9. The streamer of claim 1 wherein the at least one sensor holder comprises an opening in a center thereof for retaining a sensor substantially coaxially with the jacket.

10. The streamer of claim 9 wherein the sensor comprises a hydrophone.

11. The streamer of claim 1 further comprising a termination plate coupled to each axial end of the jacket, the termination plates each coupled to the strength member at an axial end thereof, the termination plates adapted to couple to a corresponding termination plate in another segment of the streamer so as to transmit axial force therethrough.

12. The streamer of claim 1 further comprising:
   a plurality of sensor holders coupled to the at least one strength member, each sensor holder including at least one arcuate opening for receiving the at least one strength member, the at least one arcuate opening laterally displaced from a center of each sensor holder such that when the at least one strength member is disposed therein the at least one strength member is substantially tube shaped and substantially coaxial with the jacket; and
   at least one particle motion seismic sensor disposed in the at least one strength member at a longitudinal position between two of the sensor holders.

13. A seismic streamer, comprising:
   a jacket covering an exterior of the streamer;
   a plurality of strength members extending the length of the jacket, the strength members each formed as a substantially flat belt having a width to thickness ratio of at least 10;
   a plurality of sensor holders coupled to the strength members, each sensor holder including a plurality of circumferentially spaced apart arcuate openings each for receiving a corresponding strength member, each arcuate opening laterally displaced from a center of the sensor holder such that when each strength member is disposed respectively therein the strength members are substantially tube shaped and substantially coaxial with the jacket, wherein each sensor holder has an external diameter selected to substantially match an internal diameter of the jacket, wherein each sensor holder comprises an opening substantially coaxial with the jacket for retaining a sensor therein, and wherein each sensor holder comprises an arcuate opening disposed between the strength member and an outer surface of the sensor holder to enable longitudinal passage of a cable therethrough.

14. The streamer of claim 13 wherein the jacket comprises polyurethane.

15. The streamer of claim 13 wherein the strength members comprises woven fiber.

16. The streamer of claim 13 further comprising buoyancy spacers disposed along the strength members and inside the jacket at spaced apart locations, the spacers having a density selected to provide the streamer with a selected overall density.

17. The streamer of claim 16 wherein the buoyancy spacers comprise foamed polyurethane.

18. The streamer of claim 13 further comprising a cable disposed inside the jacket, the cable having at least one of electrical conductors and an optical fiber, the cable adapted to carry signals from a sensor disposed each sensor holder to a recording system.

19. The streamer of claim 13 wherein each sensor holder comprises an opening in a center thereof for retaining a sensor substantially coaxially with the jacket.

20. The streamer of claim 19 wherein the sensor comprises a hydrophone.

21. The streamer of claim 13 further comprising a termination plate coupled to each axial end of the jacket, the termination plates each coupled to the strength members at an axial end thereof, the termination plates adapted to couple to a corresponding termination plate in another segment of the streamer so as to transmit axial force therethrough.

22. The streamer of claim 21 wherein the termination plate is articulated.

23. The streamer of claim 13 further comprising least one particle motion seismic sensor disposed within the strength members at a longitudinal position between two of the sensor holders.

24. The streamer of claim 13 wherein the plurality of arcuate openings traverse at least 75 percent of a total possible circumference.

25. A seismic streamer, comprising:
a jacket covering an exterior of the streamer;
at least one strength member extending the length of the jacket, the strength member formed as a substantially flat belt having a width to thickness ratio of at least 10;
a plurality of sensor holders coupled to the at least one strength member, each sensor holder including at least one arcuate opening for receiving the at least one strength member, the at least one arcuate opening laterally displaced from a center of each sensor holder such that when the at least one strength member is disposed therein the at least one strength member is substantially tube shaped and substantially coaxial with the jacket; and
at least one particle motion seismic sensor disposed in the at least one strength member at a longitudinal position between two of the sensor holders.

26. The streamer of claim 25 wherein the jacket comprises polyurethane.

27. The streamer of claim 25 wherein the at least one strength member comprises woven fiber.

28. The streamer of claim 25 wherein each sensor holder has an external diameter selected to substantially match an internal diameter of the jacket, the at least one sensor holder comprises an opening substantially coaxial with the jacket for retaining a sensor therein.

29. The streamer of claim 28 wherein each sensor holder comprises an arcuate opening disposed between the strength member and an outer surface of the sensor holder to enable longitudinal passage of a cable therethrough.

30. The streamer of claim 25 further comprising buoyancy spacers disposed along the at least one strength member and inside the jacket at spaced apart locations, the spacers having a density selected to provide the streamer with a selected overall density.

31. The streamer of claim 30 wherein the buoyancy spacers comprise foamed polyurethane.

32. The streamer of claim 25 further comprising a cable disposed inside the jacket, the cable having at least one of electrical conductors and an optical fiber, the cable adapted to carry signals from at least one sensor disposed in the at least one sensor holder to a recording system.

33. The streamer of claim 25 wherein each sensor holder comprises an opening in a center thereof for retaining a sensor substantially coaxially with the jacket.

34. The streamer of claim 33 wherein each sensor comprises a hydrophone.

35. The streamer of claim 25 wherein each sensor holder comprises a plurality of circumferentially spaced apart arcuate openings each configured to receive a corresponding strength member, each corresponding strength member being formed as a substantially flat belt having a width to thickness ratio of at least 10, and wherein each such arcuate opening is closed between an exterior surface of the corresponding strength member and an exterior surface of the sensor holder by a wedge shaped plug.

36. The streamer of claim 35 wherein the plurality of arcuate openings traverse at least 75 percent of a total possible circumference.

37. The streamer of claim 25 further comprising a termination plate coupled to each axial end of the jacket, the termination plates each coupled to the strength member at an axial end thereof, the termination plates adapted to couple to a corresponding termination plate in another segment of the streamer so as to transmit axial force therethrough.

38. A seismic streamer, comprising:
a jacket covering an exterior of the streamer;
at least one strength member extending the length of the jacket, the strength member formed as a substantially flat belt having a width to thickness ratio of at least 10;
at least one sensor holder coupled to the at least one strength member, the at least one sensor holder including at least one arcuate opening for receiving the at least one strength member, the at least one arcuate opening laterally displaced from a center of the at least one sensor holder such that when the at least one strength member is disposed therein the at least one strength member is substantially tube shaped and substantially coaxial with the jacket, wherein the at least one sensor holder has an external diameter selected to substantially match an internal diameter of the jacket, wherein the at least one sensor holder comprises an opening substantially coaxial with the jacket for retaining a sensor therein, and wherein the at least one sensor holder comprises an arcuate opening disposed between the strength member and an outer surface of the sensor holder to enable longitudinal passage of a cable therethrough.

39. The streamer of claim 38 wherein the jacket comprises polyurethane.

40. The streamer of claim 38 wherein the at least one strength member comprises woven fiber.

41. The streamer of claim 38 further comprising buoyancy spacers disposed along the at least one strength member and inside the jacket at spaced apart locations, the spacers having a density selected to provide the streamer with a selected overall density.

42. The streamer of claim 41 wherein the buoyancy spacers comprise foamed polyurethane.

43. The streamer of claim 38 further comprising a cable disposed inside the jacket, the cable having at least one of electrical conductors and an optical fiber, the cable adapted to carry signals from at least one sensor disposed in the at least one sensor holder to a recording system.

44. The streamer of claim 38 wherein the at least one sensor holder comprises an opening in a center thereof for retaining a sensor substantially coaxially with the jacket.

45. The streamer of claim 44 wherein the sensor comprises a hydrophone.

46. The streamer of claim 38 wherein the at least one sensor holder comprises a plurality of circumferentially spaced apart arcuate openings each configured to receive a corresponding strength member, each corresponding strength member being formed as a substantially flat belt having a width to thickness ratio of at least 10, and wherein each such arcuate opening is closed between an exterior surface of the corresponding strength member and an exterior surface of the sensor holder by a wedge shaped plug.

47. The streamer of claim 46 wherein the plurality of arcuate openings traverse at least 75 percent of a total possible circumference.

48. The streamer of claim 38 further comprising a termination plate coupled to each axial end of the jacket, the termination plates each coupled to the strength member at an axial end thereof, the termination plates adapted to couple to a corresponding termination plate in another segment of the streamer so as to transmit axial force therethrough.

49. The streamer of claim 38 further comprising:
a plurality of sensor holders coupled to the at least one strength member, each sensor holder including at least one arcuate opening for receiving the at least one strength member, the at least one arcuate opening laterally displaced from a center of each sensor holder such that when the at least one strength member is disposed therein the at least one strength member is substantially tube shaped and substantially coaxial with the jacket; and
at least one particle motion seismic sensor disposed in the at least one strength member at a longitudinal position between two of the sensor holders.

50. A seismic streamer, comprising:
a jacket covering an exterior of the streamer;
a plurality of strength members extending the length of the jacket, the strength members each formed as a substantially flat belt having a width to thickness ratio of at least 10;
a plurality of sensor holders coupled to the strength members, each sensor holder including a plurality of circumferentially spaced apart arcuate openings each for receiving a corresponding strength member, each arcuate opening laterally displaced from a center of the sensor holder such that when each strength member is disposed respectively therein the strength members are substantially tube shaped and substantially coaxial with the jacket, wherein each sensor holder has an external diameter selected to substantially match an internal diameter of the jacket; and
at least one particle motion seismic sensor disposed within the strength members at a longitudinal position between two of the sensor holders.

51. The streamer of claim 50 wherein the jacket comprises polyurethane.

52. The streamer of claim 50 wherein the strength members comprises woven fiber.

53. The streamer of claim 50 wherein each sensor holder has an external diameter selected to substantially match an internal diameter of the jacket, the at least one sensor holder comprises an opening substantially coaxial with the jacket for retaining a sensor therein.

54. The streamer of claim 53 wherein each sensor holder comprises an arcuate opening disposed between the strength member and an outer surface of the sensor holder to enable longitudinal passage of a cable therethrough.

55. The streamer of claim 50 further comprising buoyancy spacers disposed along the strength members and inside the jacket at spaced apart locations, the spacers having a density selected to provide the streamer with a selected overall density.

56. The streamer of claim 55 wherein the buoyancy spacers comprise foamed polyurethane.

57. The streamer of claim 50 further comprising a cable disposed inside the jacket, the cable having at least one of electrical conductors and an optical fiber, the cable adapted to carry signals from a sensor disposed each sensor holder to a recording system.

58. The streamer of claim 50 wherein each sensor holder comprises an opening in a center thereof for retaining a sensor substantially coaxially with the jacket.

59. The streamer of claim 58 wherein the sensor comprises a hydrophone.

60. The streamer of claim 50 further comprising a termination plate coupled to each axial end of the jacket, the termination plates each coupled to the strength members at an axial end thereof, the termination plates adapted to couple to a corresponding termination plate in another segment of the streamer so as to transmit axial force therethrough.

61. The streamer of claim 60 wherein the termination plate is articulated.

62. The streamer of claim 50 wherein the plurality of arcuate openings traverse at least 75 percent of a total possible circumference.

* * * * *